Figure 1:
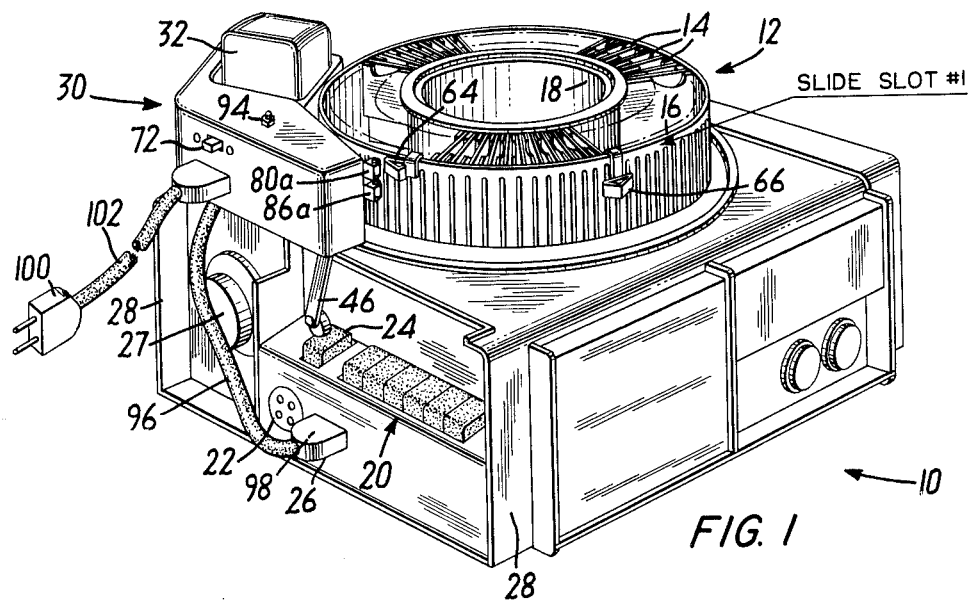

Nov. 16, 1965   H. GALLINA   3,217,595

DEVICE FOR POSITIONING A ROTATABLE MEMBER

Filed June 5, 1963

INVENTOR.
HAROLD GALLINA
BY
Brumbaugh, Free, Graves &
Donohue
his ATTORNEYS

United States Patent Office 3,217,595
Patented Nov. 16, 1965

1

3,217,595
DEVICE FOR POSITIONING A ROTATABLE
MEMBER
Harold Gallina, 40 Park View Ave., Belleville 9, N.J.
Filed June 5, 1963, Ser. No. 285,685
4 Claims. (Cl. 88—28)

This invention relates to a device for positioning a member and, more particularly, to a device for automatically returning a rotatable member to a predetermined angle orientation when it is in another predetermined orientation.

The occasion often arises in various mechanisms and devices wherein it is desired to return a rotatable member to a given angular orientation from a second orientation. For example, a relatively recent development in slide projection equipment is the type of projector employing a rotatable circular magazine having radially disposed slots, each of which carries a single slide transparency. In these projectors, a slide is withdrawn from its slot, positioned in a projection chamber, and returned to the slot after viewing. The magazine is then rotated to position the next slot for removal and showing of the slide carried therein.

Some of these types of projectors are provided with remote controls for performing such operations as focusing the images on the screen, changing the slides, often both in forward and in reverse directions, and turning the machine on and off. Thus, it is possible, for example, for a lecturer to operate the projector entirely from the lectern without the assistance of an operator.

One disadvantage of the presently known projectors of this type is that the slides must be shown in sequence, that is, a selected group of slides cannot be skipped. Additionally, there is no way of returning a given slide to the projecting station at a predetermined point in the showing of a series of slides, except by the use of the reverse viewing mechanisms in which the slides may be shown in reverse order. However, when a large number of slides have already been shown and it is desired to return to the beginning, for example, the reverse mechanism would necessitate showing each and every slide between the first and the last in reverse order. It has been found that the effectiveness of the use of the projector solely by remote control by lecturers, particularly where a given lecture is presented repeatedly, is severely limited because of these disadvantages. Additionally, the lack of facilities for automatically repeating a group of slides prevents the use of such projectors for unattended operation, for example, in advertising displays.

There is provided, in accordance with the invention, a device for positioning a rotatable member in a predetermined angular orientation when it is in another predetermined orientation, for example, a rotatable magazine of a slide projector to enable a given group of slides to be shown repeatedly. The repeating device includes a first indicating element removably attached to the rotatable member at a first position, a second indicating element removably attached to the rotatable member at a second position, and means for rotating the member. The moving means is controlled by means responsive to the indicating elements, which are so positioned on the rotatable member that the controlling means responds to the first element when a given location on the member is in a given position and responds to the second indicating element when the member has been rotated to place a second given location on the member in a given position. The means for rotating the member may be movably mounted adjacent thereto, in which event, means are provided for moving the rotating means into operable engagement with the rotatable member.

Further, in accordance with the invention, when the apparatus with which the device is used includes a mechanism which selectively prevents the free rotation of the member and means for releasing the aforesaid mechanism, the device may include means for actuating the releasing means, thereby enabling free rotation of the member by the rotating means. Additionally, the device may include means for delaying the operation of the rotating means until after the mechanism which presents free rotation has been released.

Figure 2:
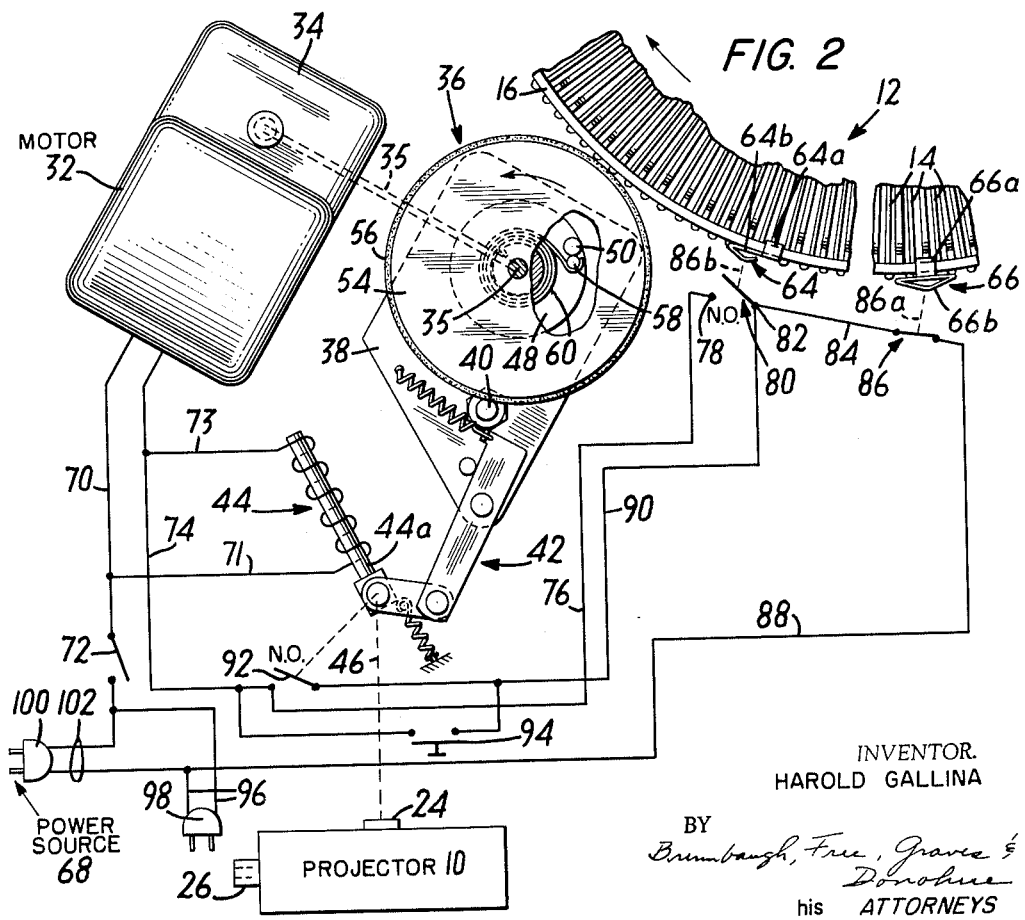

For a better understanding of the invention, reference may be made to the following detailed description of an exemplary embodiment of the device, taken in conjunction with the figures of the accompanying drawing, in which:

FIG. 1 is a pictorial view of a slide projector having a rotatable magazine with an exemplary device installed thereon; and FIG. 2 is a schematic plan view of the device of FIG. 1.

The projector 10 illustrated in FIG. 1 is a particular type, known as the "Carousel Projector," which is manufactured by the Eastman Kodak Company of Rochester, New York and has met with considerable commercial success. The projector 10 includes a circular magazine 12 rotatably mounted on the top having 80 radially disposed slots 14 located between an outer wall 16 and a concentric inner wall 18 thereof. The projector mechanism moves the magazine so that the slots 18 of the magazine 12 are successively positioned above a projection chamber which is not shown but is below the indicated location on FIG. 1 of slide slot #1. The mechanism is actuated either automatically by a timer, manually through a push button control center 20 at the back of the projector 10, or by a remote control device (not shown) which is connected into a receptacle 22.

The mechanism of the projector is adapted only for moving the magazine 12 through an angle subtended by two adjacent slots. There is no way to return the magazine automatically to a given position, except by turning it by hand. To do this, it is first necessary to depress button 24 on the control center 20. This releases a mechanism of the projector which ordinarily prevents manual rotation of the magazine so that it can be turned to any desired position.

The projector is, of course, operated by ordinary A.C. power. A power cord supplied with the projector is plugged into a receptacle 26 at the back. The power receptacle 26, the remote control cord receptacle 22, the control center 20 and a control 27 for the automatic timer of the projector are all recessed within a projecting flange 28 which surrounds three sides of the back of the projector.

A device in accordance with the invention which will be termed a repeating device 30 hereinafter, is mounted at the left back corner of the top of the projector adjacent the magazine 12. The repeating device 30 may be installed by means of a suitable bracket (not shown) which is attached to the flange 28 of the projector housing.

Referring to FIG. 2, the repeating device 30 includes a motor 32 and a drive system 36 which are coupled together through a reduction gear 34, the drive system 36 being installed on a shaft 35 of the gear. For a better showing of the spatial relation between elements 32–36, the portion of FIG. 2 in which those elements are illustrated is an isometric view in which shaft 35 is shown schematically. Actually, the motor-gear assembly 32, 34 is mounted vertically directly above element 36, the shaft 35 is vertical, and the entire unit formed of elements 32–36 is carried on a plate 38 which is pivotally mounted on a pin 40 projecting up from a base plate (not shown).

The plate 38 is coupled by a lever system 42 to a solenoid 44 affixed on the base plate. The axial movement of the armature 44a inward when the solenoid winding is energized causes the lever system 42 to pivot the plate 38 to move the drive system 36 into operative engagement with the magazine 12. The armature 44a is also coupled to an arm 46, best shown in FIG. 1, which pushes down the release button 24 of the projector when the solenoid 44 is energized.

Inasmuch as the magazine 12 cannot be rotated unless the release button 24 is first pushed, the drive system 36 is arranged to afford a time delay between the actuation of the release button 24 and the rotation of the magazine 12 by providing, as shown in FIG. 2, a slip clutch arrangement. A disc 48 having an upwardly projecting pin 50 is fixedly secured to the driven shaft 35 of the gear 34. Rotatably mounted on the shaft 35 is a driving wheel 54, which may include a rubber ring 56 securely installed about its perimeter for better friction contact with the magazine 12. In the showing of FIG. 2 a hole has been indicated as cut through wheel 54 to expose to view the elements underneath. The driving wheel 54 has a downwardly projecting pin 58 so positioned that its path of rotation coincides with that of the pin 50. A spring 60 connected between the shaft 35 and pin 58 urges the driving wheel 54 counterclockwise, as shown in FIG. 2, to maintain the wheel 54 with the pin 58 engaged against the pin 50.

As later described in more detail, when the driving wheel 54 is first brought into contact with the magazine 12, the shaft 35, disc 48 and pin 50 rotate counterclockwise, while the driving wheel 54 is retained stationary by its contact with the magazine when it in turn initially remains stationary because of its inertia. When, thereafter, the pin 50 rotates through a little less than 360° with respect to the pin 58, the driving wheel 54 becomes directly coupled to the shaft 35 by virtue of pin 50 meeting and engaging the pin 58, the pin 50 now being located on the opposite side of pin 58 from the position shown in FIG. 2. Once this engagement has taken place, the wheel 54 drives the magazine 12 clockwise.

The repeating device 30 includes the control circuit shown in FIG. 2 which is responsive to indicating elements 64 and 66 removably attached at predetermined positions on the magazine 12, as will be described hereinafter. One terminal of the motor 32 is connected to one side of a power source (not shown) by a plug 100, a cord 102 and a lead 70 (FIG. 2), which includes a manually operated on-off switch 72. The other terminal of the motor 32 is connected by leads 74 and 76 to fixed contact 78 of normally open microswitch 80. The solenoid 44 is connected in parallel with the motor 32 by leads 71 and 73. The movable contact 82 of switch 80 is connected by lead 84 through normally closed microswitch 86 and by lead 88 to the other side of the power supply 68. Therefore, when switches 72, 80 and 86 are closed, a first power circuit to the motor 32 and the solenoid 44 is formed.

Terminal 82 of switch 80 is connected by lead 90, through normally open switch 92 and by lead 74 to the motor 32, so that when switches 72, 92 and 86 are closed, a second power circuit to the motor 32 and the solenoid 44 is established. The switch 92 is bridged by a pushbutton switch 94 which connects leads 74 and 90.

Connected across the power line 102 is a power cord 96 having a plug 98 for connecting power to the power receptacle 26 of the projector 10, thus eliminating the need for connecting the projector and the repeating device separately.

Referring to FIG. 1, the on-off switch 72 is mounted externally on the repeating device 30 for manual actuation. Switches 80 and 86 are mounted vertically over one another in the device 30 adjacent the magazine 12 and have respective switch actuator arms 80a and 86a which are engageable by the indicating elements 64 and 66. Switch 80 is normally open and is closed upon its actuator 80a being contacted by indicating element 64. Switch 86 is normally closed and is opened upon its actuator 86a being contacted by indicating element 66. Normally open switch 92 (not shown in FIG. 1) is coupled to armature 44a of the solenoid 44 and is closed upon energizing of the winding of the solenoid.

The indicating elements 64 and 66 include U-shaped clip portions 64a and 66a which attach over the outer wall 16 of the magazine 14 and support contacting portions 64b and 66b, respectively. The contacting portion 64b of element 64 is offset clockwise from the clip portion 64a so that the switch actuator arm 80a is contacted to close switch 80 only when the magazine 12 is being moved by the projector mechanism to bring another slot 14 into position adjacent the projecting chamber. At this time, a given slide has been shown and returned to the magazine, but the magazine is not yet in position for showing the next slide. The contacting portion 66b of element 66 is aligned with the clip portion 66a so that, as will be apparent from the description of the operation of the device hereinafter, the rotation of the magazine 12 by the repeating device 30 will be stopped when a given slot 14, and slide, are positioned adjacent the chamber ready to be shown. The paths of the contacting portions 64b and 66b of the elements during rotation are offset vertically from each other, so that they will contact and actuate, respectively, the switch actuators 80a and 86a. While in FIG. 2, the actuators 80a and 86a are, for convenience of showing, represented as being angularly spaced from each other around magazine 12 and as being simultaneously contacted by clip portions 64a and 66a, respectively, it is to be emphasized that, in practice, the switch elements 80, 80a, and 86, 86a are preferably vertically in line to be in angular registration (as shown in FIG. 1), and that, ordinarily the clip portions 64a and 66a make contact at different times with, respectively, the actuators 80a and 86a.

For purposes of describing the operation of the repeating device, it will be assumed that seventy-six slides are shown by the projector, the first sixty being shown once and the last sixteen being shown repeatedly. First, the slides are installed in the magazine 12 so that they are shown in proper sequence when the magazine is rotated counterclockwise. The indicating elements 64 and 66 are then attached to the outer wall 16 of the magazine 12 by inserting their clip portions 64a and 66b into the slots of the magazine. Element 66 is installed in the location where it will contact switch actuator 86a when the slide in slot #60, the last of the slides which are to be shown only once, is positioned for showing by the projection chamber of the projector. Element 64 is attached to the magazine such that it will contact actuator 80a to close switch 80 after the last slide of the group to be repeated, the one in slot #76, has been shown and the magazine is being moved to position slot #77 adjacent the viewing chamber. The user can readily determine the proper slots in which to place the clip portions 64a and 66a of the indicating elements by placing the magazine in the positions referred to above and noting the slots which are then radially inward of the switch actuators 80a and 86a.

The repeating device 30 and the projector can now be connected to the source of power by plug 100 and cord 102 and by plug 98 and cord 96 and the on-off switch 72 closed to render the repeating device 30 operative. It should be noted that the device 30 may be installed on the projector but can remain inactive by leaving the switch 72 open.

All seventy-six slides can now be shown in sequence in the conventional manner, the magazine being rotated counterclockwise. When the indicating element 66 contacts switch actuator 86a during this sequence, there will be no effect on the device 30, inasmuch as neither the first nor the second power circuit are completed, switches 80 and 92 being open.

After the slide in slot #76, the last slide in the group which is repeated, has been shown, the projector control is actuated to show the next slide, the mechanism replaces the aforementioned slide into its slot 14 in the magazine 12 and starts to move the magazine 12 to the next position. During the movement of the magazine 12 to the next position, switch 80 is closed by the depressing of follower 80a by the contact portion 64b of indicating element 64, thereby completing the first power circuit, through leads 70, 74 and 76, switch 80, lead 84, normally closed switch 86 and lead 88. The solenoid 44 is thereby energized to withdraw its armature 44a so as to (1) close switch 92, (2) pivot mounting plate 38 to engage the driving wheel 54 against the outer wall 16 of the magazine 12, and (3) actuate arm 48 to depress the lock release push button 24 to thereby render the magazine 12 freely rotatable.

The closing of switch 92 energizes motor 32 which, however, is initially uncoupled from the magazine for a period acting as a time delay. As earlier described, such time delay is required to permit the magazine locking mechanism to be released, and the delay is afforded by the time delay clutch arrangement. More particularly, when the motor 32 first starts, its initial movement causes the clockwise rotation of shaft 35 and disc 48 while the rotatable driving wheel 54 and the magazine 12 remain stationary. The disc 48 turns through slightly less than 360° until the pin 50 is located on the opposite side of pin 58 than is shown in FIG. 2. Only after the initial one revolution of shaft 35 is the driving wheel 54 directly connected to the shaft 35 in order to rotate the magazine 12 clockwise. Inasmuch as the wheel 54 is driven relatively slowly, at say 30 r.p.m., the projector mechanism is released before the magazine is subjected to any significant rotational force.

After the one revolution in which the clutch operates, the wheel 54 is then directly coupled to the motor 32 and starts rotating the magazine clockwise. The indicating element 64 quickly leaves contact with switch actuator 80a, thereby opening switch 80 and breaking the first power circuit to the motor 32 and the solenoid 44. However, the power for the motor 32 and the solenoid 44 is continued to be supplied through leads 70 and 74, switch 92, leads 90 and 84, switch 86 and lead 88, which constitute the second power circuit.

When the magazine 12 has been rotated clockwise so that switch actuator 86a is contacted by the indicating element 66, switch 86 is opened, thereby breaking the second power circuit. Solenoid 44 is immediately de-energized and its armature 44a is drawn outwardly by the spring returns to (1) open switch 92, (2) retract arm 48 to release the lock release button 24, and (3) pivot the driving wheel 54 out of engagement with the magazine 12. The magazine is thereby stopped so that slide #60, which is, as described above, oriented in a known relationship with respect to the indicating element 66, is positioned adjacent the projecting chamber of the projector. As soon as wheel 54 disengages from magazine 12, the wheel is driven counterclockwise by spring 60 until pin 58 contacts pin 50 in the manner shown in FIG. 2 to thereby ready the time delay clutch arrangement to provide another time delay.

Inasmuch as the operation of the projector mechanism was interrupted during the movement of the magazine 12 between slide projecting positions, slide #60 is not shown, but rather the projector mechanism resumes operation upon release of lock release button 24 and rotates the magazine counterclockwise to position slide #61 adjacent the projecting chamber. This and subsequent slides may now be shown in the conventional manner. After the showing of slide #61, the magazine 12 is rotated to move the indicating element 66 out of contact with the switch actuator arm 86a, thereby readying the control circuit of the repeating device 30 for another cycle.

It will be noted that the operation of the repeating device 30 is fully automatic and results in the movement of the magazine 12 to a predetermined position after a given slide has been shown. However, push-button switch 94, which is externally mounted on the device 30 for manual operation, enables the repeating device to rotate the magazine 12 to position a predetermined slide for viewing at any time. The closing of switch 94 completes a circuit through leads 70, 74, 90 and 84, switch 86 and lead 88 to start the motor 32 and energize the solenoid 44, thereby initiating the operating sequence described above.

When the magazine 12 has been returned to the indexed position with a predetermined slide ready for showing, the subsequent slides up to and including a slide indexed to the indicating element 64 may be shown in the normal manner. The repeating device will operate to return the magazine 12 in the above-described manner for an unlimited number of recycles of a given group of slides. In this way, the projector, when used with remote control or controlled by its timing mechanism, can be operated for continuous viewing of a selected group of slides without the intervention of an operator.

It will be understood by those skilled in the art that the above-described embodiment of the invention is meant to be merely exemplary and susceptible of considerable modification and variation without departing from the spirit and scope of the invention. Additionally, the device has application in many fields other than for photographic slide projectors. Accordingly, the scope of the invention is not deemed to be limited, except as defined in the appended claims.

I claim:

1. In a slide projector having a rotatable magazine with a plurality of radially disposed slots for receiving slides, a mechanism for preventing the free rotation of the magazine, a device for releasing the foresaid mechanism to enable free rotation of the magazine and means for rotating said magazine through an angle subtended by two adjacent slots to successively position each slot for projecting the slide carried therein, the combination therewith of a repeating device, comprising means for rotating the magazine through an angle subtended by two predetermined, spaced-apart, non-adjacent slots, said rotating means movably mounted adjacent the magazine, means for moving said rotating means into operative engagement with the magazine, means for actuating the releasing device, means for delaying the operation of the rotating device until after the releasing device is actuated, a first indicator element removably attached to the magazine at a first position, a second indicating element removably attached to the magazine at a second position, and means responsive to said elements for controlling said rotating means, said moving means and said actuating means.

2. In a slide projector having a rotatable magazine with a plurality of radially disposed slots for carrying slides, a fixed station where the slides are successively projected, a mechanism which prevents the free rotation of the magazine and a device rendering the aforesaid mechanism inoperative and enabling free rotation of the magazine, the combination therewith of a repeating device for returning a rotatable magazine of a slide projector to position a first predetermined slide carried by the magazine adjacent the projecting station when a second predetermined slide is positioned adjacent the projecting station, comprising a support, means for attaching the support to the projector, a mounting plate movably mounted on said support, means mounted on said plate for rotating the magazine, said rotating means including a motor having a shaft, a driving wheel rotatably mounted on said shaft, a pin projecting from said driving wheel, a member fastened to said shaft engageable by said pin and limiting rotation of said wheel on said shaft to substantially one revolution and spring means urging said wheel against said member, means for moving the plate to selectively engage and disengage said wheel with the magazine, a first indicating element removably mounted in a predetermined position on the magazine, a second indicating element removably mounted in a second position on the magazine, and means responsive to said second indicating element for controlling said rotating means and said moving means to move said wheel into engagement with the magazine and to start rotation of the magazine when said second predetermined slide is adjacent the projecting station, and means responsive to said second indicating element for controlling said moving means and said rotating means to move said plate to disengage said wheel from the magazine and to stop the rotation of the magazine when the first predetermined slide is positioned adjacent the projecting station.

3. The device as claimed in claim 2 further comprising means operable by said moving means for actuating the device rendering the magazine rotation-preventing mechanism of the projector inoperative.

4. A repeating device for a slide projector having a rotatable magazine with a plurality of radially disposed slots for receiving slides, a mechanism for preventing the free rotation of the magazine, a device for releasing the aforesaid mechanism to enable free rotation of the magazine and means for rotating said magazine through an angle subtended by two adjacent slots to successively position each slot for projecting the slide carried therein, comprising means for rotating the magazine through an angle subtended by two predetermined, spaced-apart, non-adjacent slots, said rotating means movably mounted adjacent the magazine, means for moving said rotating means into operative engagement with the magazine, means for actuating the releasing device, means for delaying the operation of the rotating device until after the releasing device is actuated, and means adapted to respond to the position of the magazine for controlling said rotation means, said moving means and said actuating means.

References Cited by the Examiner
UNITED STATES PATENTS

| | | | |
|---|---|---|---|
| 2,866,021 | 12/1958 | Hildum | 200—38.2 |
| 2,881,832 | 4/1959 | Leonard | 200—38.2 |
| 2,938,287 | 5/1960 | Bernabei. | |
| 3,131,508 | 5/1964 | Brown | 200—27 X |

OTHER REFERENCES

German application No. 1,109,404, pub. June 22, 1961.
German application No. 1,118,991, pub. Dec. 7, 1961.

EVON C. BLUNK, *Primary Examiner.*

NORTON ANSHER, *Examiner.*